United States Patent [19]

Leppo et al.

[11] Patent Number: 5,365,160

[45] Date of Patent: Nov. 15, 1994

[54] APPARATUS AND METHOD FOR CHARGING BATTERIES

[75] Inventors: Lee E. Leppo, Tallmadge; Charles A. Rinkes, Medina, both of Ohio

[73] Assignee: Telxon Corporation, Akron, Ohio

[21] Appl. No.: 755,890

[22] Filed: Sep. 6, 1991

[51] Int. Cl.[5] .............................................. H02J 7/00
[52] U.S. Cl. ...................................... 320/22; 320/20; 320/39
[58] Field of Search ........................ 320/31, 32, 39, 20, 320/21, 22

[56] References Cited

U.S. PATENT DOCUMENTS

| | | | |
|---|---|---|---|
| 3,938,021 | 2/1976 | Kosmin | 320/40 |
| 4,118,661 | 10/1978 | Siekierski et al. | 320/40 |
| 4,392,101 | 7/1983 | Saar et al. | 320/20 |
| 4,418,310 | 11/1983 | Bollinger | 320/39 |
| 4,670,703 | 6/1987 | Williams | 320/22 |
| 4,710,694 | 12/1987 | Sutphin et al. | 320/21 |
| 4,746,852 | 5/1988 | Martin | 320/20 |
| 4,806,840 | 2/1989 | Alexander et al. | 320/20 |
| 4,849,682 | 7/1989 | Bauer et al. | 320/15 |
| 5,140,252 | 8/1992 | Kizu et al. | 320/20 |

FOREIGN PATENT DOCUMENTS

| | | |
|---|---|---|
| 3404564 | 8/1985 | Germany . |
| 2237696 | 8/1991 | United Kingdom . |

OTHER PUBLICATIONS

"Fast-Charge Batteries," Anne Watson Swager, Bower Sources Dec. 7, 1989, pp. 180–188.

"Cadnica Fast Charge Control Unit Model SCU-X," Sanyo Electric Co., Ltd., Oct. 2, 1989, pp. 1–7.

*Primary Examiner*—R. J. Hickey
*Attorney, Agent, or Firm*—Pretty, Schroeder, Brueggemann & Clark

[57] ABSTRACT

A charging system monitors the rate of change in battery voltage, adjusts the rate of charging, and checks the changes in battery voltage following adjustments in the rate of charging to observe a predetermined sequence of voltage changes that signifies when a battery is fully charged. The charging system determines the slope between consecutive battery voltage measurements. The charging system charges a battery at the full battery capacity in response to positive or zero voltage slope measurements and reduces the charging rate in response to negative voltage slope measurements. A nickel-cadmium battery is fully charged when at least one sequence of a negative slope, followed by a decrease in charging rate, then a positive or flat slope, followed by an increase in charge rate, and finally another negative slope is observed.

23 Claims, 4 Drawing Sheets

APPARATUS AND METHOD FOR CHARGING BATTERIES

BACKGROUND OF THE INVENTION

1. Field of the Invention

This invention relates generally to battery chargers and, more particularly, to battery chargers that control the rate of charging to determine when batteries have reached full charge.

2. Description of the Related Art

Rechargeable batteries, such as nickel cadmium batteries, are popular because they provide a ready source of electrical energy and avoid the waste associated with the disposal of batteries that cannot be recharged. When rechargeable batteries are discharged, they are connected to a charging system that restores them to a charged condition. In a conventional fast-charge system, for example, a current that is equal to the battery charging capacity C in ampere-hours is delivered to the battery for one hour. This charging rate leaves the battery with approximately a full charge.

Conventional charging systems can damage batteries by overcharging them, or can waste time and energy by undercharging them. Undercharging is a condition in which the electrical energy delivered to a rechargeable battery is not sufficient for the battery to deliver its rated power. As a result of undercharging, a battery probably will not be capable of operating equipment with which it is used and will have to be recharged more frequently. Repeated recharging takes the battery out of service and is a great inconvenience. Overcharging is a condition in which electrical energy continues to be delivered to the battery after it has reached full charge. As a result of overcharging, the battery cycle life is reduced, and the battery likely will need to be replaced much earlier than anticipated. A number of charging systems are designed to charge batteries without damage, and to provide fast and safe charging up to the full rated power of the batteries, by monitoring indicators of full charging.

Battery temperature and voltage can be used to indicate full charge. Both the temperature and internal resistance of a discharged battery increase as the battery is charged. Some charging systems monitor the temperature of a battery and attempt to prevent overcharging by stopping the charging process when a maximum allowed temperature is reached. This temperature, however, might not correspond to the maximum battery temperature reached during charging. For example, the maximum temperature reached by a charging battery can vary depending on ambient temperature and on the condition and age of the battery. Selecting battery temperature as the charge indicator to be monitored is made more difficult by the need to carefully select and locate temperature sensors to ensure accurate monitoring.

The monitored battery temperatures themselves can be misleading. Fluctuations in the temperature of the battery can occur, resulting in momentarily elevated temperatures in the absence of a full charge. The frequency and magnitude of the fluctuations can vary with the environmental conditions and the condition of the battery. Thus, monitoring the battery temperature for a maximum value can result in premature completion of charging and, therefore, undercharging rather than overcharging.

The battery voltage also increases with the charging of the battery, reaching a peak and then rapidly decreasing. Although monitoring battery voltage avoids the problems of ambient temperature, sensor placement, and influences of adjacent batteries, it still can fall prey to voltage fluctuations and can result in premature completion of charging. The voltage fluctuations occur in a manner similar to the temperature fluctuations and can result in momentarily high voltages that do not represent the peak value. The momentary voltage changes are often interpreted as peak charging values by typical charging systems that monitor voltage. Such charging systems respond to the momentary voltage peaks by quickly halting charging, often resulting in an undercharged condition. On the other hand, a system that does not respond to voltage changes in a sufficiently short time period can overcharge a battery.

Finally, many charging systems can only charge a single battery at a time, and cannot charge a plurality of batteries to their full charge. This is inconvenient, because many devices require multiple batteries for operation, and it is easier to simultaneously remove several discharged batteries from a device and replace them with charged batteries, while simultaneously placing the discharged batteries into a charging system.

From the discussion above, it should be apparent that there is a need for a battery charging system that charges rechargeable batteries to their full charge without overcharging them due to slow response and without undercharging them due to spurious indicators of full charge. The present invention satisfies this need.

SUMMARY OF THE INVENTION

The invention provides a charging system, for use with rechargeable batteries, that monitors the rate of change in battery voltage, that adjusts the rate of charging, and that checks the change in battery voltage in response to an adjustment in the rate of charging to observe a predetermined sequence of changes that signifies when the battery is fully charged. In this way, the charging system can charge a battery much closer to full charge than conventional systems, without danger of overcharging. The sequence of battery voltage changes is observed by periodically making a series of battery voltage measurements and determining the slope between successive measurements. The charging system responds to a flat or positive voltage slope by charging the battery at the maximum allowable battery charging rate C in ampere-hours, and responds to a negative voltage slope by proportionally reducing the charging rate down to a predetermined minimum. The charging system deems a battery to be fully charged when the system detects at least one cycle of a negative battery voltage slope when charging at the full charging rate, followed by a flat or positive slope after reducing the charging rate, and then another negative slope after increasing the charging rate. Following this scheme, the battery will quickly and efficiently reach full charge with little danger of overcharging.

The battery charging system initially charges a battery at the full rated charging capacity C of the battery in ampere-hours. The battery charging system can include a constant current source that is capable of providing current to the battery at the full C rate. The system advantageously measures battery voltage at regular time intervals and determines the voltage slope between measurements. When the voltage slope is negative, the charging system reduces the rate of charging over a charging interval by reducing the proportion of the time during which the constant current source provides current to the battery. A succession of negative voltage slopes results in successive reductions in the rate of charging. For example, each negative voltage slope can result in a one-fourth reduction in the time during which the current source provides current to the battery. On the fourth successive negative slope, the charging current is set to a predetermined value, such as one-tenth of C.

To avoid responding to ordinary, minor fluctuations in the battery voltage, the charging system sets a limit on the magnitude of battery voltage change required to update or change the slope, given the battery voltage resolution of the charging system, such that a multiple of the resolution is required before the slope will be updated. For example, if the resolution of the battery voltage measurement is 30 mV, then a positive change of 60 mV is required to indicate a positive voltage slope, and a negative change of 60 mV is required to indicate a negative slope. All other differences in voltage are indicated as a flat slope.

As a battery is charging, its voltage passes through various measurement thresholds that can cause the charging system to experience unstable voltage readings. For example, the charging system can include sampling devices that provide the voltage measurements. The measurement thresholds are points at which the sampling devices are unsure whether to return a higher or lower value than the previous battery voltage reading. After the battery voltage passes through a measurement threshold, the sampling device becomes stable again. Therefore, to increase the resolution of the charging system when suspect measurements are obtained, if four successive voltage values are identical, then the charging system does not require a voltage change to be a multiple of the system resolution before a voltage change is indicated and a new slope is calculated. Rather, the charging system will require a voltage change equal only to the resolution of the system for a positive or negative slope calculation. For example, if the system has a battery voltage resolution of 30 mV, and a change of 60 mV is ordinarily required for a positive or negative slope calculation, then a change of only 30 mV will result in a positive or negative slope update if four successive voltage values are identical.

The battery charging system advantageously includes other features to ensure valid voltage measurements. First, the voltage of a charging battery is never sampled unless the charging current has been applied for at least two seconds. Secondly, whenever the charge rate is changed, the next sampled voltage is ignored to allow the voltage time to stabilize. Allowing time for the battery to stabilize increases the likelihood of obtaining valid voltage measurements.

Finally, multiple batteries can be charged by the system. The multiple batteries are placed in an operational queue to establish a charging priority. For example, the voltage of the first battery in the queue can be checked and its charging current can be varied as described above. Whenever the first battery is not being charged at the full rate C, the current not applied to the first battery during the charging time interval is applied at a reduced rate, such as one-tenth C, to the remaining batteries such that there is little danger of overcharging them. In this way, the remaining batteries in the queue can receive a trickle or warm-up charge while the first battery is being charged at the maximum safe charging rate. When the first battery reaches full charge, the second battery in the queue takes the first place in the queue and receives priority for being charged at the full charging rate, C. This charging scheme increases the efficiency of the charging system without risk of overcharging the remaining batteries.

Other features and advantages of the present invention should be apparent from the following description of the preferred embodiment, taken in conjunction with the accompanying drawings, which illustrate, by way of example, the principles of the invention.

DESCRIPTION OF THE PREFERRED EMBODIMENT

Figure 1:
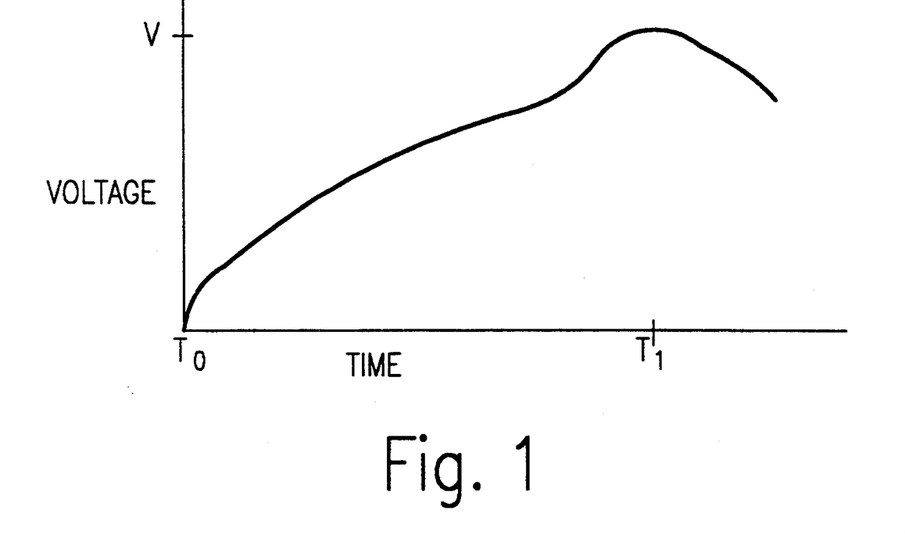
FIG. 1 is graph representing the characteristic battery voltage versus time for a nickel-cadmium rechargeable battery being charged at a charge rate of C.

FIG. 1 is a plot of battery voltage versus time for a typical rechargeable battery, such as a nickel-cadmium battery. Under a conventional fast-charge charging scheme, a fully discharged battery is supplied with electrical energy beginning at time TO at the fully rated charging capacity of the battery, C, in ampere-hours. The battery voltage rises steadily from TO until it reaches a peak value V. After reaching the peak value, the battery voltage decreases. The peak battery voltage is the point at which the battery is fully charged. Continuing to apply electrical energy to the battery eventually will result in overcharging.

Figure 2:
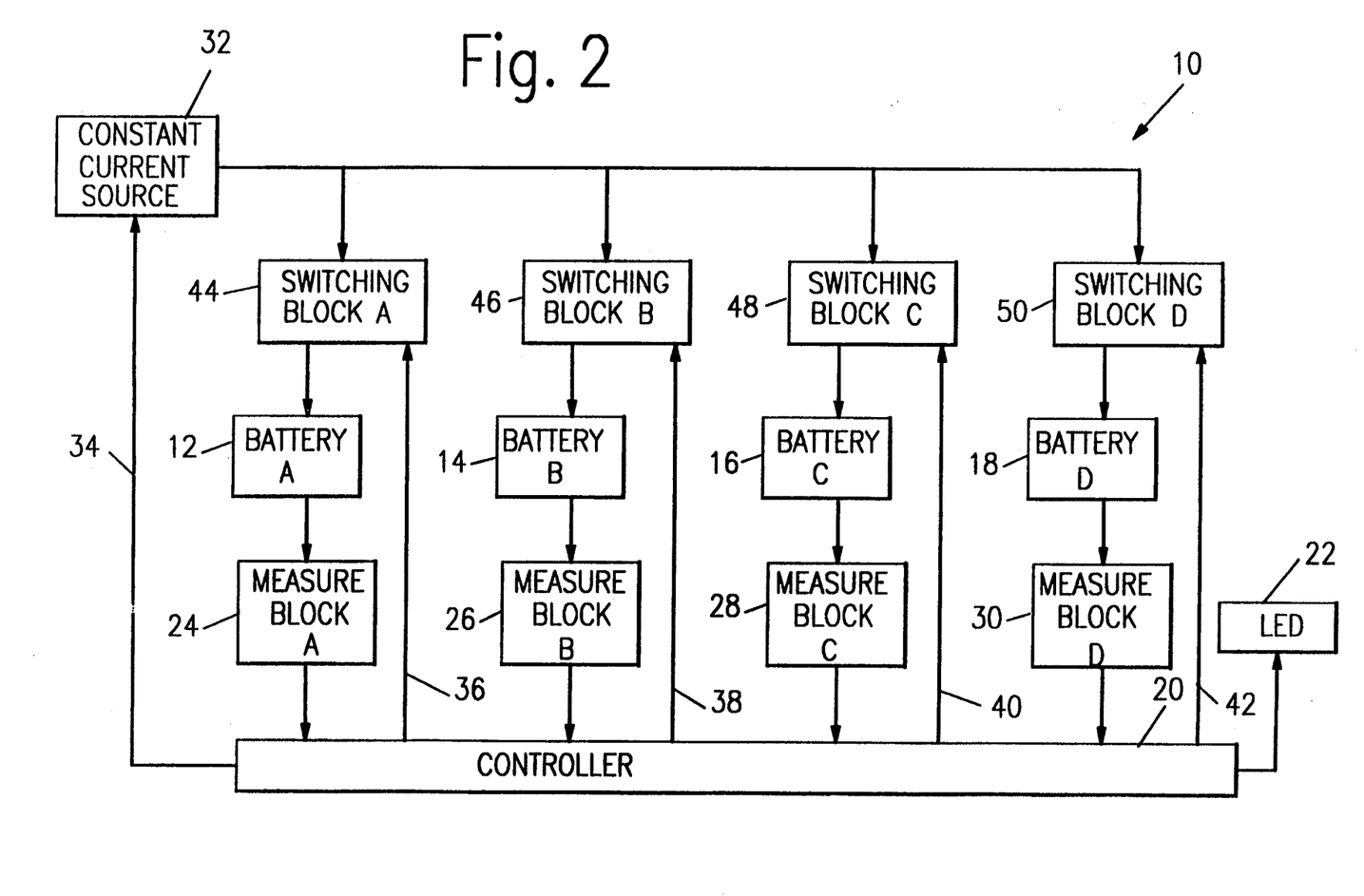
FIG. 2 is a block diagram of a battery charging system constructed in accordance with the present invention.

FIG. 2 is a block diagram of a battery charging system 10 in accordance with the present invention that is capable of charging a plurality of batteries 12, 14, 16, and 18 designated Battery A, Battery B, Battery C, and Battery D, respectively, from a discharged condition into a fully charged condition at up to a maximum allowable battery charging rate of C ampere-hours without overcharging the batteries. The charging system operates under control of a controller 20 that designates each battery with a place in a queue such that a first battery 12 is treated as being first in the queue and is the first to be fully charged. After the first battery is fully charged, each of the other batteries 14, 16, and 18 in turn assume the designation of first battery and are charged.

The controller 20 obtains periodic measurements of the voltage of the first battery 12 in the queue, calculates a voltage slope that corresponds to the change in voltage measurements, and reduces the amount of electrical energy delivered to the battery if the slope is negative and increases it up to a maximum if the slope is positive. The controller deems the battery to be fully charged after at least one sequence of calculating a negative battery voltage slope, reducing the electrical energy delivered to the battery, calculating a positive battery voltage slope, increasing the electrical energy delivered to the battery, and once again calculating a negative battery voltage slope. The controller turns on indicator lights, such as LEDs 22, when full charge is reached. It will be appreciated that the controller 20 bases its control solely on determinations of the polarity, positive or negative, of the voltage slope. Thus, the slope of the voltage change needs to be determined only to the extent of ascertaining its polarity.

Preferably, the controller 20 is a microcontroller incorporating an internal clock, data latches, memory, and an analog-to-digital (A/D) converter, such as the 68HC05 microcontroller manufactured by Motorola, Inc. Those skilled in the art will recognize that many other arrangements for a suitable controller are possible. For example, the A/D converter can be external to the microcontroller, or sampling devices other than an A/D converter can be used. The controller 20 periodically receives battery voltage signals from measuring blocks 24, 26, 28, and 30 that are coupled to each of the batteries 12, 14, 16, and 18, respectively. While four batteries are illustrated, it is to be understood that the system can be designed to charge other numbers of batteries, and the charging system 10 will accommodate a single battery 12 for charging as well as any other number less than its full capacity.

The controller 20 varies the amount of electrical energy delivered to each battery, for example, by providing a control signal to a constant current source 32 over a signal line 34 and by providing a charge signal to each of the batteries 12, 14, 16, and 18 over signal lines 36, 38, 40, and 42, respectively. The constant current source can deliver current at up to the maximum allowable charging rate of the battery, C. Current sources other than constant current sources can be used, but the arrangement illustrated in FIG. 2 is preferred because it is relatively simple and inexpensive. The charge signals for the batteries are received by switching blocks 44, 46, 48, and 50, respectively. Each switching block is coupled to the constant current source 32 and is either open or closed in response to the charge signal received from the controller 20.

As noted above, the controller 20 adjusts the electrical energy delivered to a battery 12 depending on whether a positive, flat, or negative voltage slope is calculated from the voltage measurements. The controller adjusts the electrical energy delivered to the battery by establishing a twenty-second charging interval and changing the amount of time in the charging interval during which current from the constant current source 32 is applied to the battery. The controller 20 makes this adjustment in one of two ways, depending on whether a single battery 12 is to be charged or if a plurality of batteries 12-18 are to be charged.

If a single battery 12 is to be charged, the controller 20 charges the battery at the full charge rate C by providing a control signal to the constant current source 32 such that the current source provides its electrical energy to the battery continuously during the twenty-second charging interval. If the controller determines that the electrical energy delivered to the battery should be reduced, the controller reduces the amount of time in the charging interval during which the current source provides its energy.

Figure 3:
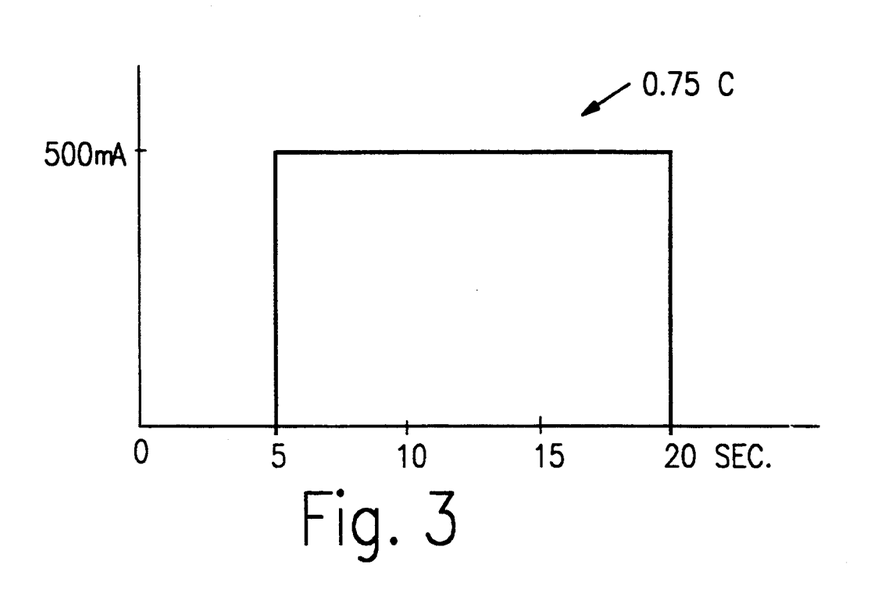
FIG. 3 is a graph that illustrates the switching of the constant current source in FIG. 2 during a measuring interval to achieve a charging rate of 0.75 C.

FIG. 3 illustrates the application of electrical energy from the constant current source 32 to a battery 12 necessary to achieve battery charging at a rate equal to three-fourths of the battery capacity C. Within the twenty-second charging interval established by the controller 20, the controller provides the control signal to the current source 32 such that the current source directs its 500 mA output to the battery for the last fifteen seconds of the twenty-second charging interval. During the first five seconds of the charging interval, the current source is turned off. A one-half C (0.50 C) rate of charging is accomplished by providing a control signal to the current source 32 such that the current source provides electrical energy to the battery 12 for only the last half of the charging interval. Thus, electrical energy can be delivered from the constant current source to a battery at precisely varying fractions of the full C rate. The current source output of 500 mA is suitable for the batteries 12-18, which have a battery voltage less than 10 volts, but those skilled in the art will recognize that other current sources also can be used.

If a plurality of batteries 12, 14, 16, and 18 are to be charged, then the controller 20 provides a control signal to the constant current source 32 that keeps the current source continuously on. The controller then adjusts the rate of charging by adjusting the charging signals provided to the switching blocks 44, 46, 48, and 50 to make them open or closed for appropriate times during the twenty-second charging interval. For example, if the first battery 12 is to be charged at a 0.75 C rate, then the controller signals the Battery A switching block 44 to be closed only for the last fifteen seconds of the charging interval.

When a plurality of batteries are to be charged and the first battery 12 is not receiving a full C rate of charging, the excess output of the constant current source 32 during the charging interval is advantageously utilized by splitting the remaining time among the remaining batteries at a charging rate that will provide a trickle/warm-up charge to the batteries without danger of overcharging them. For example, if the first battery 12 is receiving a 0.5 C rate of charging, the output of the constant current source is not being used for the first ten seconds of the charging interval. Therefore, the switching blocks 46, 48, and 50 for the remaining batteries 14, 16, and 18 are closed for an interval of time during the first ten seconds that will provide a predetermined trickle/warm-up charge, such as 0.10 C, to the batteries.

Figure 4:
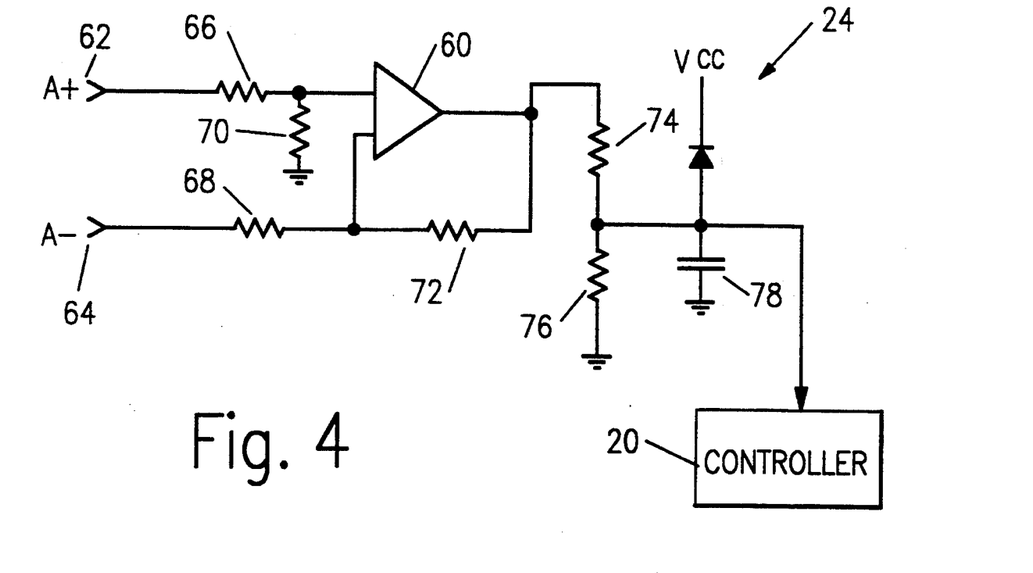
FIG. 4 is a schematic diagram of one of the battery measuring blocks illustrated in FIG. 2.

The details of the measuring blocks and switching blocks illustrated in FIG. 2 are well within the abilities of those skilled in the art, but the implementations of the preferred embodiment will be described. FIG. 4 is a schematic diagram of one of the measuring blocks 24 illustrated in FIG. 2. It is to be understood that the remaining measuring blocks 26, 28, and 30 are similarly constructed. The first measuring block 24 includes a differential amplifier 60 whose inputs are coupled to the positive terminal 62 of the first battery 12 and the negative terminal 64 of the first battery. The differential amplifier provides an output signal equal to the voltage differential between the terminals, in conjunction with resistors 66, 68, 70, and 72, all of 100K ohms, that provide a differential circuit network. The output signal of the network is stepped down to the appropriate voltage level by a resistor 74 and by a low-pass filter including a resistor 76 and a capacitor 78. The output is then provided to the analog-to-digital converter input of the controller 20.

Figure 5:
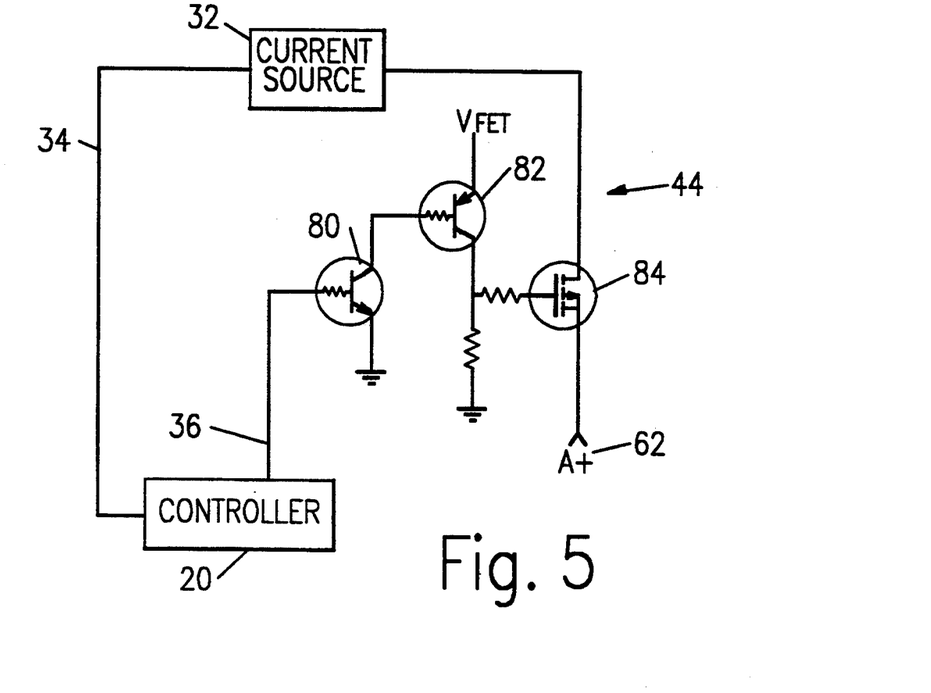
FIG. 5 is a schematic diagram of one of the current switching blocks illustrated in FIG. 2.
Figure 6A:
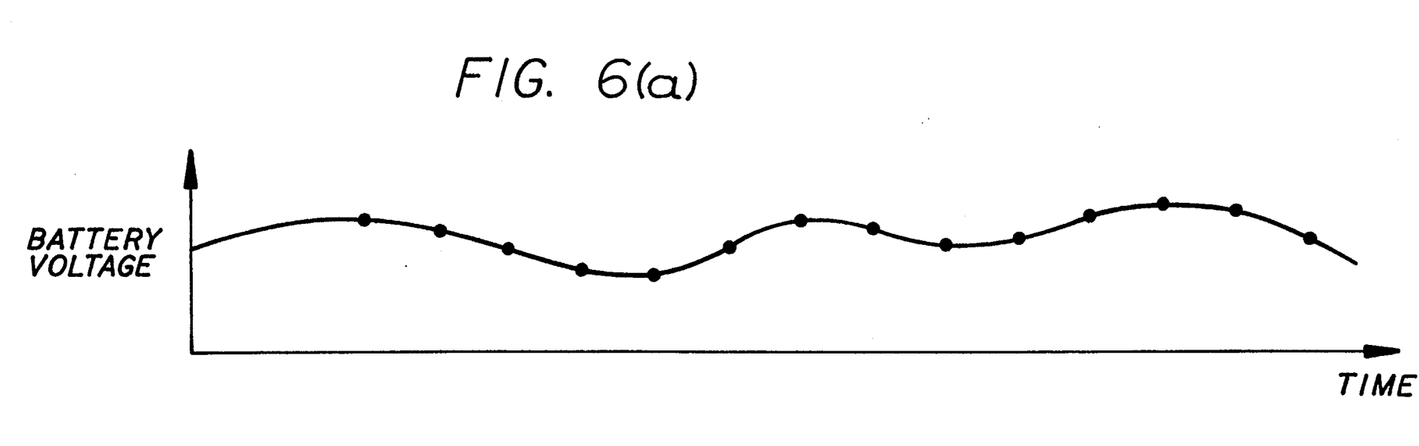
Figure 6B:
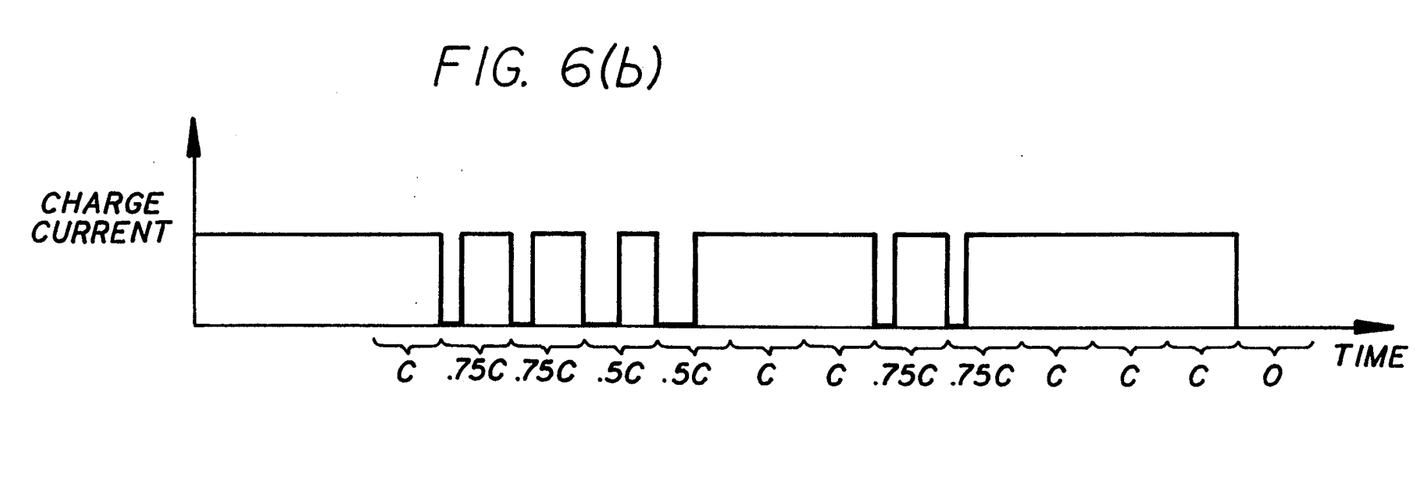

FIG. 5 illustrates the switching block 44 for the first battery 12 illustrated in FIG. 2. Again, it is to be understood that the remaining switching blocks 46, 48, and 50 are similarly constructed. The charging signal for the first battery 12 is received from the controller 20 over the signal line 36 by an NPN digital transistor 80 whose collector is connected to the base of a PNP digital transistor 82, which controls an FET 84. When the charging signal from the controller is high, the NPN transistor 80 is turned on, which then turns on the PNP transistor 82, which then turns on the FET 84, allowing electrical energy from the constant current source 32 to be conducted to the positive terminal 62 of the first battery 12. When the charging signal from the controller 20 is low, the NPN digital transistor 80 is turned off, which turns off the PNP digital transistor and the FET, thus preventing current from flowing from the constant current source 32 to the positive terminal 62 of the battery.

The structure of FIGS. 2-5 described above is used by the controller 20 to apply electrical energy to the batteries 12, 14, 16, and 18 at a predetermined charging rate, to observe the response as evidenced by the respective battery voltages, and to adjust the charging rate until a fully charged battery is indicated. The controller controls the charging to accurately determine when a battery has reached full charge and charges the battery faster and closer to full charge, without overcharging, when compared with conventional charging systems.

More particularly, the controller 20 begins charging the first battery 12 in the queue by applying electrical energy to the battery at a rate equal to the maximum allowable charging rate C of the battery using the measuring block 24 and its integral analog-to-digital (A/D) converter, which has a resolution of 30 mV. Other voltage resolutions are acceptable, depending on the magnitude of the voltages. The battery voltage is always sampled at the end of the twenty-second window. This ensures that current has been applied to the battery for at least two seconds before sampling, which allows the battery voltage time to stabilize. To ensure the greatest likelihood of obtaining a reliable voltage measurement, eleven consecutive voltage readings are accepted at whatever rate the analog-to-digital converter of the controller 20 will provide stable readings, and the most prevalent of the eleven readings is kept as the measured voltage value.

After a twenty-second interval, another series of eleven voltage readings are accepted by the controller 20 and a new measured voltage value is determined. The controller 20 then determines the slope of the curve between the two voltage readings to be either positive, negative, or flat. If the new voltage reading is two or more resolution units of the A/D converter in the controller, i.e., 60 mV or more, above the old voltage reading, then the controller designates the slope to be positive. If the new voltage reading is two or more resolution units below the old voltage reading, then the slope is designated negative. If the change in voltage readings does not qualify for either a positive or negative change in slope, then the controller designates the slope to be flat, or zero.

Each time a new slope is calculated, the charging rate can be adjusted according to the scheme described above. Thus, if the updated slope is positive, then the controller 20 sets the charging rate equal to the battery rate C. If the updated slope is negative, then the charging rate is reduced by a factor of 0.25 C. Using this scheme, two successive sample intervals with sufficient change in voltage readings to indicate two negative slopes will result in the controller reducing the charging rate first to a 0.75 C rate and then to a 0.50 C rate. On a fourth successive change in slope that is negative, however, the controller will reduce the charging rate not to zero but to 0.10 C. If a fifth successive change in slope is negative, then the controller 20 indicates a faulty battery by activating an appropriate signal LED 22. It has been found that a charging battery should not continue to experience successive negative voltage slopes beyond four if the charging rate is being reduced.

The voltage slope becomes negative because, as the battery 12 is charged, its temperature and internal resistance increase, slowing the rate of charge. When the controller 20 reduces the charging rate in response to a negative battery voltage slope, the battery 12 has an opportunity to cool down. At near full charge, this results in the battery voltage slope again becoming positive or flat and, in response, the controller 20 again applies the full charging rate C to the battery. This reheats the battery and again causes the slope to become negative. The controller indicates a fully charged battery after at least one of these sequences, because it has been determined that a fully charged nickel-cadmium battery is reliably indicated by this sequence. Those skilled in the art will appreciate that other types of batteries might be characterized by other charging voltage sequences, or waveforms.

More particularly, in the preferred embodiment, the controller 20 requires one of the sequences described above if a "Fast Slope" change is detected, and requires two negative-positive slope sequences otherwise. A Fast Slope is indicated if many positive slope changes are detected within a relatively short period of time. Specifically, in the preferred embodiment, if four positive slope changes are detected within a twelve-minute interval, then a Fast Slope is indicated.

If at any time the voltage slope is positive or flat, then the controller 20 adjusts the charging rate to be equal to the maximum allowable battery charging rate, C. Thus, if the battery 12 is being charged at the full rate C and three negative slope changes are encountered followed by a positive slope change, then the controller decreases the charging rate to 0.25 C and then increases it to the full charging rate C.

If a battery 12 is already near full charge when it is placed in the charging system 10, then it will quickly experience a negative to positive voltage slope sequence. To decrease the chance of overcharging a battery that is near full charge when placed in the battery charging system, upon encountering a negative slope, the controller 20 provides charging signals to the constant current source 32 to increase the reduction in charging current from 0.25 C at each negative slope to 0.50 C at each negative slope if the battery 12 has been in the charging system for less than ten minutes. Thus, a battery that has been charging less than ten minutes and is being charged at the full rate C will be charged at the charging rate of 0.50 C at the first instance of a negative battery voltage slope, and will be reduced to 0.10 C at the next negative slope. As before, the controller 20 will increase the charging rate to C if at any time a positive or flat voltage slope is encountered.

The controller 20 adjusts the criteria for a fully charged battery depending on the charging history. As noted above, two sequences of first a negative voltage slope when charging at the maximum allowable C rate, followed by a positive or flat slope after reducing the charging rate, followed by another negative slope after increasing the charging rate, will be sufficient to indicate a fully charged battery if the battery 12 has been charging for less than ten minutes. If the battery has been charging for more than ten minutes, but no Fast Slope has been encountered, then two occurrences of the above sequences are necessary before the controller 20 will indicate a fully charged battery. However, the controller will indicate a fully charged battery after only one instance of the above sequence if the battery has been charging for more than ten minutes and a Fast Slope has been detected. Anytime two positive slopes are detected without a negative slope, the count for the above-mentioned cycle is cleared, due to the fact that the changes indicate a voltage fluctuation and not a fully charged battery.

When the charging rate is changed, the likelihood of accurate voltage measurements is increased if the battery is allowed to stabilize. Therefore, each time after the controller 20 has changed the charging rate, the controller ignores the voltage measurement at the next twenty-second interval. Instead, the controller calculates a new slope using the next two voltage measurements. Thus, three samples are necessary after every change in charging current to calculate a new slope. This increases the reliability of the voltage measurements and increases the efficiency of the charging system 10.

Finally, as a battery 12 is charging, its voltage passes through measurement threshold values at which the integral A/D converter of the controller 20 is unsure whether to return a higher or lower value than the previous sample. After the battery voltage passes through a measurement threshold, the A/D converter becomes stable again. The instability can result in voltage measurements that alternate between increasing and decreasing values centered about the threshold and that are not sufficient to change the slope. Therefore, the controller 20 effectively increases the resolution of the voltage measurements by defining new criteria for updating the slope when successive voltage measurements are equal.

More particularly, if a voltage measurement is identical to the previous three measurements, then the controller requires a difference of only one resolution unit for a positive or negative slope update. Thus, using the 30 mV resolution of the preferred embodiment, if four consecutive identical voltage readings are obtained, then the controller 20 will indicate a positive slope change if the next voltage measurement is only 30 mV greater and will indicate a negative slope change if the next voltage measurement is only 30 mV less. This allows quicker and more efficient detection of a fully charged battery.

From the foregoing, it will be appreciated that the battery charging system and method in accordance with the invention fully charges a plurality of batteries to the full charge level of each respective battery, and carefully monitors the battery charge level to avoid damage to the batteries due to overcharging or undercharging. Thus, battery charging systems in accordance with the invention safely charge multiple batteries to their full charge levels.

The present invention has been described above in terms of a presently preferred embodiment so that an understanding of the present invention can be conveyed. There are, however, many configurations for battery charging systems not specifically described herein, but with which the present invention is applicable. The present invention should therefore not be seen as limited to the particular embodiments described herein, but rather, it should be understood that the present invention has applicability with respect to battery charging systems in a variety of applications. All modifications, variations, or equivalent arrangements that are within the scope of the attached claims should therefore be considered to be within the scope of the invention.

We claim:

1. An apparatus for charging a rechargeable battery that has a voltage that varies with its state of charge, the apparatus comprising:
   charging means for delivering electrical energy to the battery at a controllably-variable charging rate;
   measurement means for providing periodic measurements of battery voltage; and
   control means for detecting any change in value between successive battery voltage measurements and conditioning the charging means to decrease the charging rate if the detected voltage change is negative, increase the charging rate up to a predetermined maximum rate if the detected voltage change is positive, and decrease to zero the charging rate after initially detecting a negative voltage change and subsequently detecting a positive voltage change.

2. An apparatus as defined in claim 1, wherein the control means determines a slope that corresponds to the change in value between battery voltage measurements and halts charging by the charging means if the control means detects at least one sequence of negative slope, followed by positive slope, followed by negative slope.

3. An apparatus as defined in claim 1, wherein the measurement means includes digital conversion means for periodically obtaining a plurality of battery voltage measurements during a measurement period and selecting one of the values obtained in the period as the measure of battery voltage to be provided.

4. An apparatus for charging a rechargeable battery that has a voltage that varies with its state of charge, the apparatus comprising:
   charging means for delivering a variable amount of electrical energy to the battery and charging it;
   measurement means for providing a measure of battery voltage, wherein the measurement means includes digital conversion means for periodically obtaining a plurality of battery voltage measurements during a measurement period and selecting one of the values obtained in the period as the measure of battery voltage to be provided; and
   control means for periodically receiving the measured battery voltage and changing the energy delivered to the battery by the charging means and detecting a characteristic sequence of measured-battery voltages that indicates a fully charged battery, wherein the control means decreases the electrical energy provided by the charging means by a predetermined proportion of the maximum allowable charging rate each time a change in the battery voltage indicates that the battery is near full charge.

5. An apparatus as defined in claim 4, wherein:
   the charging means includes a constant current source that produces a current; and
   the control means reduces and increases the amount of electrical energy provided by the charging means by varying the amount of time the current produced by the constant current source is applied to the battery.

6. An apparatus as defined in claim 5, wherein the digital conversion means periodically obtains battery voltage measurements and disregards the first battery voltage measurements obtained during the first measurement period after the control means has changed the electrical energy provided by the charging means.

7. An apparatus as defined in claim 5, wherein the control means disregards the first measure of battery voltage from the measurement means received after changing the electrical energy provided by the charging means.

8. An apparatus as defined in claim 3, wherein the digital conversion means selects the most prevalent battery voltage measurement obtained in the period as the measure of battery voltage to be provided.

9. An apparatus for charging a rechargeable battery that has a voltage that varies with its state of charge, the apparatus comprising:
    charging means for delivering a variable amount of electrical energy to the battery and charging it;
    measurement means for providing a measure of battery voltage; and
    control means for periodically receiving the measured battery voltage and changing the energy delivered to the battery by the charging means and detecting a characteristic sequence of measured battery voltages that indicates a fully charged battery;
    wherein the charging means includes
        a constant current source that produces a predetermined current, and
        regulating means for switching the constant current source between an on state, in which the constant state, in which the constant current source is connected to the battery, and an off state, in which the constant current source is disconnected from the battery;
    and wherein the measurement means includes sample means for periodically obtaining a battery voltage reading.

10. An apparatus as defined in claim 9, wherein the regulating means switches the constant current source to the charge state for a maximum amount of time equal to the time in the measurement period to provide a charging rate equal to a maximum allowable charging rate capacity for the battery.

11. A battery charging apparatus for charging a first rechargeable battery that has a battery voltage that varies with the state of charge of the battery, the apparatus comprising:
    charging means for delivering a variable amount of electrical energy to the battery, at up to a predetermined maximum allowable charging rate capacity of the battery, and charging the battery;
    detecting means for periodically providing an indication of the battery voltage;
    slope means for providing a slope value that indicates whether the slope of the battery voltage curve corresponding to the previous two battery voltage indicators from the detecting means is positive, negative, or flat; and
    control means for receiving the slope value from the slope means, decreasing the amount of electrical energy delivered by the charging means if the slope is negative, increasing the amount of electrical energy delivered by the charging means up to the maximum allowable rate if the slope is positive or flat, and terminating the delivery of electrical energy from the charging means if the battery voltage undergoes three consecutive sequences of change from negative slope to positive or flat slope.

12. An apparatus as defined in claim 11, wherein the detecting means includes digital conversion means for obtaining a plurality of battery voltage values that are within a predetermined range of accuracy corresponding to a resolution unit and for selecting the most prevalent value as the indicator of battery voltage.

13. An apparatus as defined in claim 12, wherein the slope means indicates a negative slope if the current battery voltage value is more than two resolution units less than the previous battery voltage value, indicates a positive slope if the current battery voltage value is more than two resolution units greater than the previous battery voltage value, and indicates a flat slope otherwise.

14. An apparatus as defined in claim 12, wherein the slope means provides a new slope value when the control means changes the amount of electrical energy provided to the battery by the charging means.

15. An apparatus as defined in claim 14, wherein the detecting means disregards at least the first indication of battery voltage after the control means has changed the amount of electrical energy delivered to the first battery by the charging means.

16. An apparatus as defined in claim 15, wherein the slope means indicates a change in slope if the current battery voltage value is one resolution unit different from the previous battery voltage value if the indicated battery voltage has not changed for three consecutive readings from the detecting means.

17. An apparatus as defined in claim 11, wherein the charging means includes:
    a constant current source that produces a predetermined current; and
    regulating means for switching the constant current source between an on state, in which the constant current source is connected to the battery, and an off state, in which the constant current source is disconnected from the battery, operable each time the detecting means provides an indication of the battery voltage.

18. An apparatus as defined in claim 17, further including:
    receiving means for receiving at least one additional rechargeable battery in addition to the first rechargeable battery; and
    distribution means for providing electrical energy to the additional rechargeable battery, at a charging rate less than the maximum allowable charging rate, if the regulating means has switched the charging means to provide electrical energy to the first rechargeable battery at less than the maximum allowable rate.

19. An apparatus as defined in claim 18;
    wherein the receiving means is adapted to receive more than one additional rechargeable battery; and
    wherein the distribution means provides electrical energy to each additional rechargeable battery, at a predetermined rate less than the maximum allowable charging rate, if the regulating means has switched the charging means to provide electrical energy to the first rechargeable battery at less than the maximum allowable rate.

20. A method for charging rechargeable batteries having a battery voltage that varies with their state of charge, comprising the steps of:

delivering electrical energy to a first battery at a rate up to a maximum allowable charging rate capacity of the battery and charging it;

periodically measuring the battery voltage of the first battery and determining a slope that corresponds to the change in battery voltage between measurements;

reducing the rate at which electrical energy is delivered to the first battery if the slope is negative and increasing it up to the maximum allowable rate if the slope is positive; and indicating that the first battery is at full charge after at least one sequence of determining a negative battery voltage slope, reducing the rate at which electrical energy is delivered to the first battery, determining a positive battery voltage slope, increasing the rate at which electrical energy is delivered to the first battery, and determining a negative battery voltage slope.

21. A method for recharging a rechargeable battery as defined in claim 20, further including the step of halting the delivery of electrical energy to the battery when the battery is indicated as being at full charge.

22. A method for recharging a rechargeable battery as defined in claim 20, wherein the step of periodically measuring the battery voltage includes the steps of:

obtaining a plurality of battery voltage values within a measurement interval; and selecting the most prevalent value as the battery voltage measurement.

23. A method for recharging a rechargeable battery as defined in claim 20, wherein the step of reducing the rate at which electrical energy is delivered further includes the step of:

delivering electrical energy to a second battery at a predetermined rate lower than the maximum allowable charging rate of the battery.

* * * * *